March 23, 1937.   J. W. LOGAN, JR   2,074,751
BRAKING SYSTEM
Filed July 19, 1935   3 Sheets-Sheet 2

INVENTOR
JOHN W. LOGAN, Jr
BY Wm. M. Cady
ATTORNEY

Patented Mar. 23, 1937

2,074,751

UNITED STATES PATENT OFFICE 2,074,751

BRAKING SYSTEM

John W. Logan, Jr., Forest Hills, Pa., assignor to The Westinghouse Air Brake Company, Wilmerding, Pa., a corporation of Pennsylvania Application July 19, 1935, Serial No. 32,145

30 Claims. (Cl. 303—3)

This invention relates to braking systems, and more particularly to braking systems for traction vehicles and railway trains employing both an electric brake and a friction brake.

In the braking of high speed trains and vehicles it is desirable that the brakes provided be operable to produce high initial retarding forces, so that the train or vehicle may be decelerated in a minimum length of time. Where friction type brakes alone are employed it is difficult to produce the required high initial retarding forces, because the coefficient of friction between the rubbing parts of a friction brake is lower at the high speeds than at the low speeds. Therefore, if a friction brake is applied with a high degree of braking force at high speeds, then the braking force must be reduced as the speed of the vehicle or train diminishes, or otherwise wheel sliding may occur.

A desirable type of brake to employ for high speed type trains and vehicles which will produce high initial retarding forces with less danger of wheel sliding, is the electrodynamic type, as for example the specific type commonly referred to as the eddy current brake. A characteristic feature of the eddy current brake is that it may be designed to produce a substantially constant braking effect over a wide range of vehicle speeds. Since the braking effect thus produced is substantially constant, the rate of retardation for a given load will be substantially constant. The operator may therefore select a desired rate of retardation by selecting the degree of current supplied to operate the eddy current brake.

At low rotational speeds, however, the eddy current brake decreases in effectiveness, the braking effect produced thereby diminishing, first slowly and then rapidly, until at zero rotational speed the eddy current brake produces no braking effect. It is therefore both desirable and necessary that where an eddy current brake is employed a supplementary form of brake, preferably a friction type brake, be employed to insure stopping of the vehicle or train, and to hold it at rest.

A principal object of the present invention is to provide an improved form of braking equipment for high speed trains and vehicles employing both an electric brake and a friction brake.

Friction brakes for railway vehicles and trains are preferably controlled by some form of fluid pressure means. A desirable method of control is to control the degree of application of the friction brake by varying the pressure of a fluid in a control pipe. Since a friction type brake is both desirable and necessary as supplementary to an eddy current type brake, it is a further object of this invention to provide a braking equipment as heretofore referred to in which both the eddy current brake and the friction brake are controlled according to variations of pressure of fluid in a control pipe.

A still further object of the invention is to provide a combined electric and fluid pressure brake equipment as just referred to, in which both type brakes are normally conditioned to be operable but with the fluid pressure brake held unapplied until the electric brake decreases in effectiveness below a predetermined or chosen value, and with the fluid pressure brake then cut into action to a degree below that at which the electric brake was applied, but sufficient to brake the train or vehicle to a stop.

If in such a brake system as that just referred to, the decrease in effectiveness of the eddy current brakes is due alone to wheel slipping, the fluid pressure brakes might be applied and thus aggravate the situation. If, however, the fluid pressure brakes are held unapplied during the wheel slipping condition the slipping wheels may again pick up speed, because as they reduce in speed the eddy current braking effect also reduces in degree, so that the tendency to slip is reduced. Or the eddy current brakes may be wholly released during the slipping period. In either case the slipping wheels will in some predetermined length of time return to substantially the original or normal speed, depending upon the adhesion between the wheels and rails. The application of the fluid pressure brakes should therefore be delayed so as to permit this return to normal speed. It is therefore a further object of the invention to delay application of the fluid pressure brakes for a predetermined interval of time when the eddy current brakes decrease in effectiveness below the value which would normally cut the fluid pressure brakes into action.

If the train or vehicle is brought to a stop with the eddy current brakes fully energized, undue heating and possible burning out of the eddy current brake windings may result. To prevent this, it is a further object of the invention to provide means for deenergizing the eddy current brake windings when the vehicle or train comes to a stop.

If the load on the vehicle or train were at all times constant, the degree of energization of the eddy current brake windings would determine the rate of retardation throughout the greater portion of the deceleration period. However, as will be obvious, the load will vary over a wide range, so that one degree of energization may produce one rate of retardation under one load condition and a different rate of retardation under a different load condition. It is a yet further object of the invention to provide means for producing substantially the same rate of retardation for a given degree of energization of the eddy current brake windings regardless of load conditions.

At times it may be desirable to render the electric brake inoperative and effect applications by means of the fluid pressure brake only, as for example when switching about the terminal yards. It is therefore a still further object of the invention to provide means for manually rendering the electric brake inoperative at the will of the operator.

A still further object of the invention is to provide a novel arrangement of apparatus for generally carrying out the aforestated and other objects, as will more fully appear from the following description, which is taken in connection with the attached drawings, wherein.

Considering now briefly at first the apparatus shown in the drawings, two eddy current brake devices are indicated by the two windings 10 and the two rotors 11. Each eddy current brake device is assumed to be associated with a vehicle axle, and for the purpose of simplicity only enough brake devices have been shown for two axles, corresponding to a two axle truck.

The friction brake devices are indicated by the brake cylinders 12. These brake cylinders may actuate braking elements of any of the commonly employed types of brakes, or they may actuate shoes 13 into engagement with the peripheries of the eddy current brake rotors 11, in the manner disclosed and described in my Patent No. 2,012,747.

For initiating and controlling applications of the brakes manually, there is provided a brake valve device 15, which controls the supply of fluid under pressure to and its release from a straight air pipe 16. The brake valve device 15 supplies fluid under pressure to the straight air pipe 16 at one end from a main reservoir 17. In order that fluid under pressure may be locally supplied from a local supply reservoir 18 to the straight air pipe, as on each car in a train, there is provided a magnet valve device 20 which operates synchronously with the brake valve device 15.

For controlling operation of the eddy current brake devices both according to the degree of pressure in straight air pipe 16 and according to the load on the vehicle, there is provided an eddy current brake control device 22. A line switch 23 controls the circuit through which current is supplied to the eddy current brake devices, while a pneumatic switch 24 controls energization of this line switch in response to fluid supplied to the straight air pipe.

In order that an application of the fluid pressure brakes shall be suppressed so long as the eddy current brakes are effective, there are provided a power response relay 25, a suppression magnet valve device 26, and a transfer valve device 28.

For the purpose of cutting the fluid pressure brakes into action upon die-away of the eddy current brakes, there are provided a retardation detector device 30 and a die-away magnet valve device 31.

For the purpose of limiting the degree of application of the fluid pressure brakes to a predetermined fraction of the degree of application of the eddy current brakes, there is provided a reducing relay valve device 32.

To effect a release of the eddy current brakes and to prevent for a predetermined interval of time application of the fluid pressure brakes associated with wheels which begin to slip, there are provided checking windings 33 associated with the eddy current braking devices, rectifier devices 34, a wheel slip detector relay 35, and a selector relay 36.

For the purpose of effecting deenergization of the eddy current brake windings 10 when the vehicle (or train) comes substantially to a stop, there are provided a motion detector relay 38 and a motion detector 39.

In order that the operator may at will render the eddy current brakes inoperative, there is provided a push switch device 40.

When a braking equipment embodying the invention is adapted to a train, the brake valve device 15, the retardation detector device 30, the pneumatic switch device 24, the motion detector relay 38, the motion detector device 39, push switch device 40, and main reservoir 17 need be supplied only on the head end or control car. All other devices and parts are then supplied locally on each car in the train as well as on the head end car, or in the case of an articulated type train on every other car.

Figure 2:
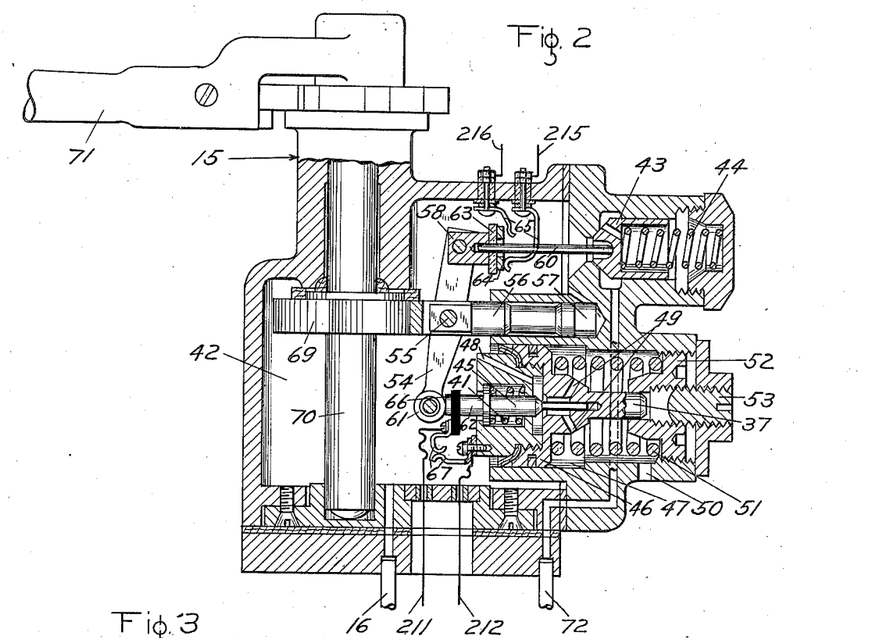
Fig. 2 is a diagrammatic view of a brake valve device shown to the upper left in Fig. 1.

Considering now in detail the devices and apparatus heretofore briefly referred to, the brake valve device 15 is embodied in a casing having a pressure chamber 42 which is in constant open communication with the straight air pipe 16. For controlling the supply of fluid under pressure to the pressure chamber 42, there is provided a supply valve 43 urged toward a seated position by a spring 44.

For controlling the release of fluid under pressure from the pressure chamber 42, there is provided a release valve 45 carried by a movable abutment 46 operatively mounted in a chamber 47. The release valve 45 is urged toward an unseated position by a spring 41, and when in unseated position establishes a communication between the chamber 42 and the atmosphere, by way of passages 48 and 49, chamber 47, and port 50.

The movable abutment 46 is subject on one side to pressure of fluid in the chamber 42 and on the other side to pressure of a regulating spring 51. Tension on the regulating spring 51 may be regulated by an adjustable member 52 containing interiorly thereof a set screw 53 providing a stop for a plunger 37 associated with the movable abutment 46, to limit the travel thereof to the right.

For effecting unseating of the supply valve 43 and seating of the release valve 45, there are provided spaced levers 54 pivotally carried at 55 intermediate their ends by a slidable pivot carrier 56 disposed in a bore 57 in the casing.

Secured between the upper ends of the spaced levers 54 is a member 58 having associated therewith a stem 60 for engaging the supply valve 43. Rotatably held between the lower ends of the spaced levers 54 is a roller 61 adapted to engage stem 62 of release valve 45.

Carried by the member 58 and insulated therefrom by an insulating element 63 is a bridging contact 64, which is adapted to bridge and connect together stationary application contacts 65 secured to and insulated from the valve device casing. Carried by and insulated from the release valve stem 62 through an insulating member 66 is one member of a pair of release contacts 67, the other member of which is carried by and insulated from the movable abutment 46. As will be observed from Fig. 2, when the supply valve 43 is seated and the release valve 45 is unseated, contacts 65 are open and contacts 67 are closed.

When the slidable pivot carrier 56 is actuated to the right, the spaced levers 54 first fulcrum about their upper ends to seat release valve 45, and when this valve is seated then fulcrum about their lower ends to effect unseating of supply valve 43. This sequence occurs because the release valve spring 41 is a lighter spring than the supply valve spring 44. During this operation the regulating spring 51, which is heavier than either or both of springs 41 and 44, is unappreciably compressed. It will thus be obvious that the amount supply valve 43 is unseated depends upon the distance the slidable pivot carrier 56 is actuated to the right.

For actuating the slidable pivot carrier 56 to the right, there is provided a cam 69 secured to an operating shaft 70 rotatable through a handle 71. The configuration of cam 69 is such that when handle 71 is moved from a release position into an application zone, pivot carrier 56 is progressively moved to the right various distances depending upon the degree of movement of handle 71.

When the handle 71 is thus moved into the application zone and supply valve 43 unseated, fluid under pressure will flow from main reservoir 17 through main reservoir pipe 72, past unseated supply valve 43, to pressure chamber 42, and from thence to straight air pipe 16. As the pressure in chamber 42 increases, the movable abutment 46 will be moved to the right, whereupon spaced levers 54 will fulcrum about pivot 55 to permit movement of supply valve 43 toward its seat under influence of its spring 44. The parts are so designed that when a pressure in chamber 42 is reached corresponding to the degree or extent of movement of the handle 71, movable abutment 46 will have moved far enough to the right for supply valve 43 to seat, thus lapping the supply to chamber 42.

If the pressure in chamber 42 should for any reason exceed that corresponding to the handle position, then movable abutment 46 will move further to the right to unseat release valve 45, and thus release fluid under pressure to the atmosphere until the desired pressure is established.

The pressure of fluid thus supplied to and maintained in chamber 42 corresponds to the degree or extent of movement of handle 71.

When release valve 45 is seated release contacts 67 will be opened, and when supply valve 43 is unseated application contacts 65 will be closed. The purpose of these contacts will appear more fully later.

Figure 1:
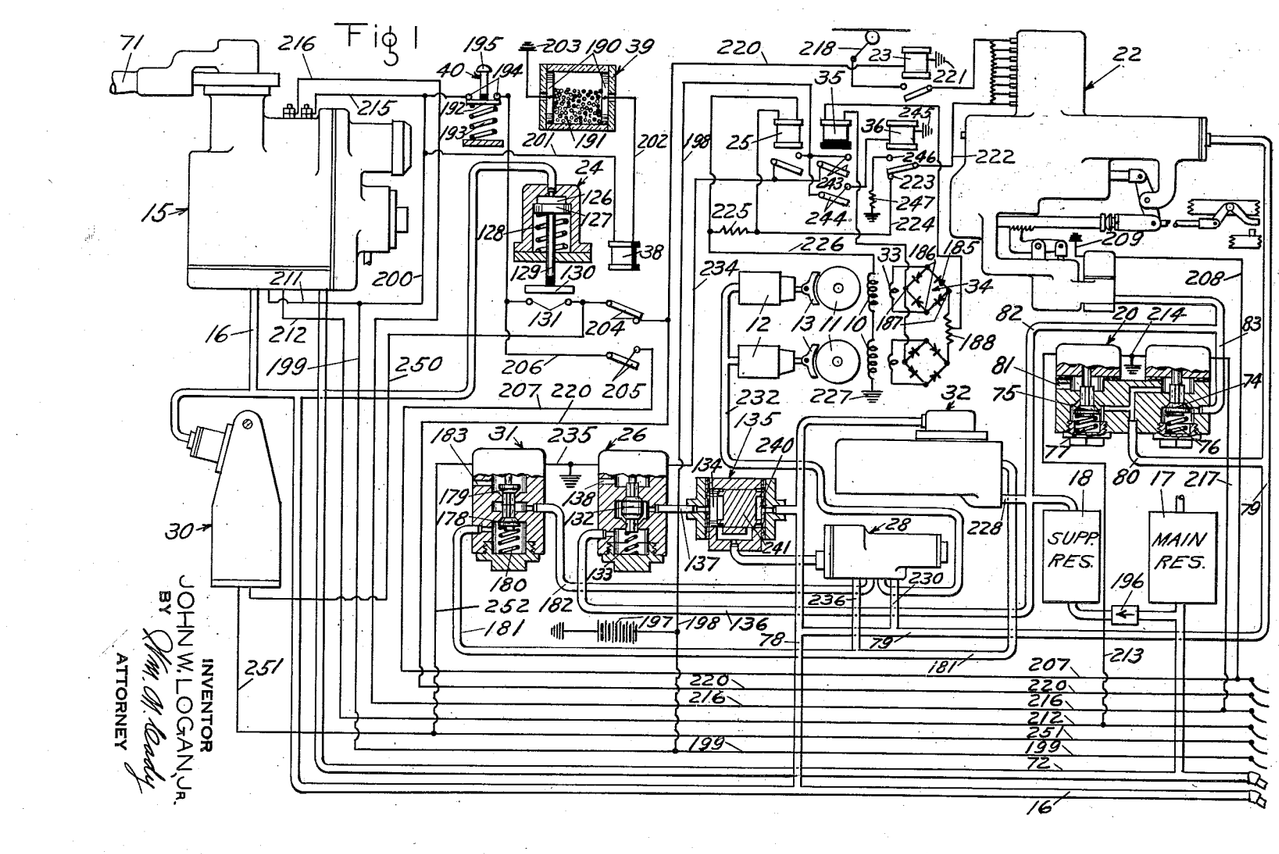
Fig. 1 is a schematic and diagrammatic arrangement of apparatus comprising one embodiment of the invention adapted to a single vehicle.

The magnet valve device 20 is embodied in a casing provided with an application valve 74 and a release valve 75. The application valve 74 is urged toward seated position by a spring 76 and toward unseated position by action of an application electromagnet in the upper part of the valve device casing, which when energized actuates the valve downwardly. The release valve 75 is also urged toward a seated position by a spring 77, and toward an unseated position by action of a release electromagnet, which when energized actuates this valve downwardly.

When the release valve 75 is unseated, a communication is established between the straight air pipe 16 and the atmosphere, by way of pipes 78, 79 and 80, past the unseated release valve 75, and through port 81. When the release valve 75 is seated this communication is cut off, and when the supply valve 74 is at the same time unseated, fluid under pressure may flow from the local reservoir 18 to the straight air pipe 16, by way of pipes 82 and 83, past the unseated supply valve 74, and pipes 80, 79 and 78.

Figures 5, 7:
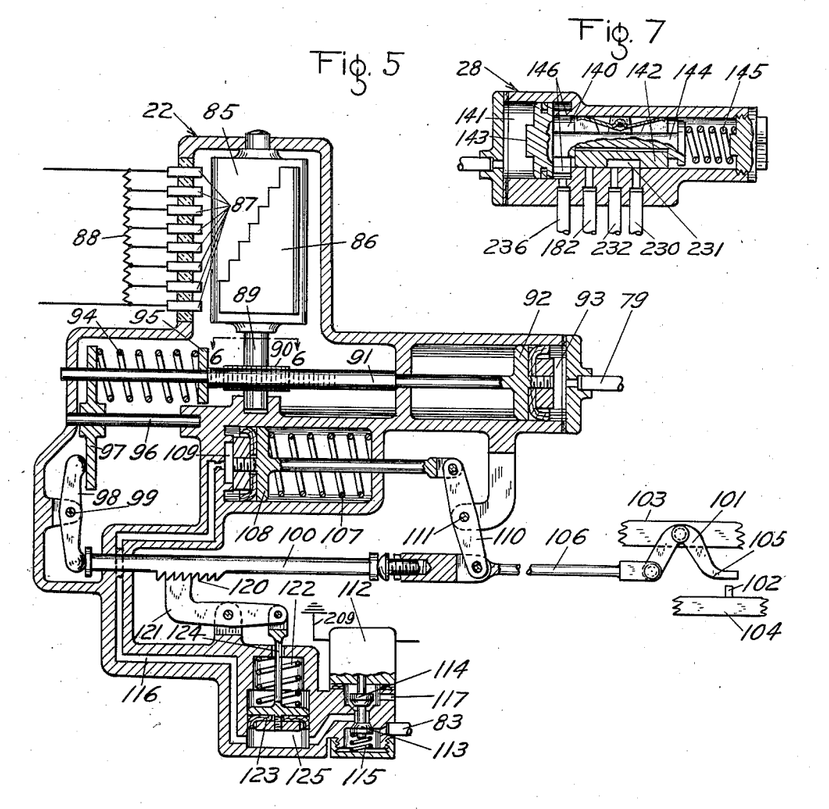
Fig. 5 is a diagrammatic view of an eddy current brake control device shown at the upper right of Fig. 1.
Fig. 7 is a diagrammatic view of a transfer valve device shown centrally of Fig. 1.
Figure 6:
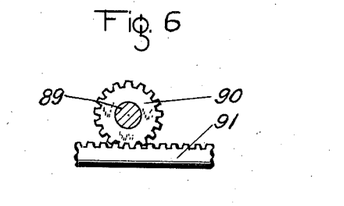
Fig. 6 is a view along the line 6—6 of Fig. 5.

The eddy current brake control device 22 is embodied in a casing having as one of its essential elements a rotatable drum 85 having secured thereto and insulated therefrom a stepped contact 86 adapted to engage stationary contacts 87 carried by and insulated from the casing. The stationary contacts 87 are connected to taps of a resistance 88, so that as the stepped contact 86 successively engages and bridges the stationary contacts 87, segments of the resistance 88 will be shunted.

The rotatable drum 85 is secured to a shaft 89 which is suitably journaled in the casing and has secured thereto a pinion 90 adapted to mesh with a rack 91 connected to a piston 92 disposed in a piston chamber 93. A spring 94 acts upon an abutment 95 secured to the rack 91 to bias the drum 85 and piston 92 to an off or release position.

When fluid under pressure is supplied to chamber 93, piston 92 and rack 91 are urged to the left until a balance is obtained between the pressure of fluid in chamber 93 and the compression of spring 94. Drum 85 is therefore rotated to a degree corresponding to the degree of fluid under pressure supplied to chamber 93.

In order that the rotation of the drum 85 shall be controlled also according to the load on the vehicle as well as according to the pressure of fluid supplied to chamber 93, a mechanism is provided which will now be described. Slidably mounted on a shaft 96 is a crosshead 97 which when moved to the right increases the tension on the spring 94. A lever 98 is pivotally mounted intermediate its ends at 99 for actuating the crosshead 97 to the right. A rod 100 engages the lower end of lever 98 and is adapted to rotate the lever 98 to a degree depending upon the deflection of a sprung portion of the vehicle when loaded.

Attached to a sprung portion 103 of the vehicle is a bell crank lever 101 having an arm 105 thereof adapted to engage a stop 102 secured to some unsprung part 104 of the vehicle. When the vehicle is loaded the sprung part 103 will move downwardly toward the unsprung part 104. If now the arm 105 is urged down into engagement with stop 102, a link 106 connected to the bell crank lever 101 will be actuated to the left to position rod 100 accordingly.

To hold arm 105 in engagement with stop 102, there is provided a piston 108 biased to the left in a piston chamber 109 by spring 107 and operatively connected with the link 106 through a lever 110 pivotally mounted intermediate its ends at 111 to some part of the casing of the eddy current brake control device 22. Therefore, when fluid under pressure is supplied to the chamber 109 rod 100 will be positioned to the left according to the load on the vehicle.

For supplying fluid under pressure to the chamber 109, there is provided a magnet valve device 112 having a supply valve 113 and a release valve 114. A spring 115 urges the supply valve 113 toward seated position and the release valve 114 toward unseated position. An electromagnet in the upper part of the valve device casing actuates the supply valve 113 to unseated position and the release valve 114 to seated position when energized, to effect a supply of fluid under pressure from the local supply reservoir 18 to the chamber 109 by way of pipes 82 and 83, past the unseated supply valve 113, and passage 116. When the supply valve 113 is seated and the release valve 114 unseated, this supply is cut off and fluid under pressure supplied to the chamber 109 is released to the atmosphere by way of passage 116, past the unseated release valve 114, and port 117.

It will thus be seen that when the magnet valve device is energized, a tension will be placed on spring 94 according to the load on the vehicle, and when the magnet valve device is deenergized this tension is released. In order that the tension thus placed on spring 94 may be retained when the magnet valve device is deenergized, the rod 100 is provided with a ratch 120 which is engaged by coacting serrated edges of a pawl 121, through action of a spring 122.

The spring 122 normally urges downwardly a piston 123, which is connected with the pawl 121 through a stem 124. Piston 123 is disposed in a chamber 125 to which fluid under pressure is supplied simultaneously with that supplied to chamber 109. Therefore, when piston 108 in chamber 109 is actuated to the right piston 123 is actuated upwardly to disengage pawl 121 from the ratch 120, thus permitting rod 100 to be positioned to the left.

When supply valve 113 is seated and release valve 114 unseated, to release fluid under pressure from both chambers 109 and 125, spring 122 actuates piston 123 downwardly to cause pawl 121 to again engage ratch 120 and thus hold rod 100 in the position to the left to which it was actuated by piston 108. The tension placed on spring 94 according to the vehicle load is thus retained after the magnet valve device has been deenergized.

The pneumatic switch device 24 is embodied in a casing having a chamber 126 in which is disposed a piston 127 actuated upwardly by a spring 128. The piston 127 is provided with a stem 129 having secured thereto and insulated therefrom a contact 130 adapted to engage and connect together stationary contacts 131 when fluid under pressure is supplied to chamber 126 to actuate piston 127 downwardly.

The suppression magnet valve device 26 is embodied in a casing provided with a double beat valve 132, which is urged toward an upper seated position by a spring 133 and toward a lower seated position by action of an electromagnet in the upper part of the valve device casing, which when energized actuates the double beat valve downwardly.

When the double beat valve 132 is in upper seated position a communication is established between the local supply reservoir 18 and a chamber 134 of a double check valve device 135, by way of pipe 136, past the open lower seat of double beat valve 132, and pipe 137. When the double beat valve is in lower seated position, this communication is cut off and a communication is established from the double check valve chamber 134 to the atmosphere, past the open upper seat of double beat valve 132, and port 138.

The transfer valve device 28 is embodied in a casing provided with a slide valve chamber 140 and a piston chamber 141. Disposed in the slide valve chamber 140 is a slide valve 142 and disposed in the piston chamber 141 is a piston 143 having a stem 144 recessed to receive the slide valve 142, so as to move it coextensive with movement of the piston 143. A coil spring 145 engages the piston stem 144 and normally acts to bias the piston 143 to its extreme left hand position. However, when fluid under pressure is supplied to the piston chamber 141 to a degree sufficient to overbalance the combined pressure of fluid in slide valve chamber 140 and that of spring 145, piston 143 will be actuated to the right until it engages stops 146. Movement of piston 143 from its extreme left hand to its extreme right hand position shifts slide valve 142 to control communications to be hereinafter more fully described.

Figure 3:
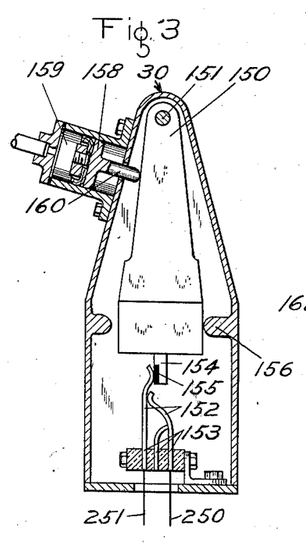
Fig. 3 is a diagrammatic view of a retardation detector device shown at the extreme left of Fig. 1.

The retardation detector device 30 is embodied in a casing comprising a pendulum 150 pivotally mounted at 151 and adapted to control contacts 152. The contacts 152 are normally closed and are secured to the detector device casing and insulated therefrom by insulating members 153. The pendulum 150 is provided with a finger 154 carrying an insulating element 155 adapted to engage one of the contacts 152 so as to open the contacts when the pendulum is swung to the left.

The retardation detector device is positioned on the head end car so that when the train is at rest or traveling at a constant rate of speed the pendulum 150 remains in the vertical position shown in Figure 3, resting against stop 156. When, however, during deceleration of the train the rate of speed changes, the pendulum 150 swings to the left under the resulting force of inertia, and the finger 154 opens the contacts 152 when the pendulum has swung through a predetermined distance.

For opposing movement of the pendulum 150 to the left, there is provided a piston 158 disposed in a piston chamber 159 and provided with a stem 160 adapted to engage the pendulum. The opposition to movement of the pendulum 150 by the piston 158 is proportional to the degree of fluid under pressure supplied to the chamber 159, so that the rate of deceleration which will swing the pendulum to the left far enough to open contacts 152 will depend upon the degree of pressure in the piston chamber 159.

Figure 4:
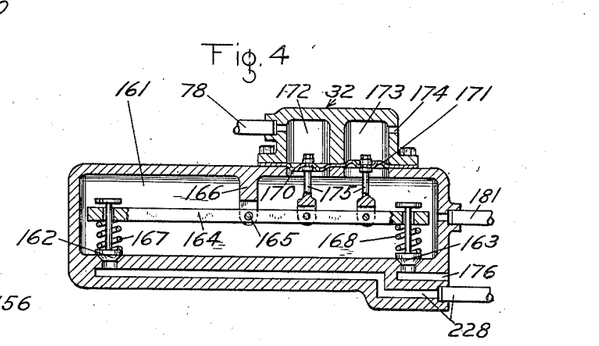
Fig. 4 is a diagrammatic view of a reducing relay valve device shown centrally of Fig. 1.

The reducing relay valve device 32 may be embodied in any convenient form of casing provided with a chamber 161 having a supply valve 162 for controlling the supply of fluid under pressure to the chamber and a release valve 163 for controlling the release of fluid under pressure from the chamber. The supply valve 162 and the release valve 163 are preferably operated by a lever 164 pivoted intermediate its ends at 165 to a lug 166 projecting from the valve device casing.

When no external force is acting upon the lever 164, a spring 167 holds the supply valve 162 seated, and a similar spring 168 holds the release valve 163 seated. When, however, lever 164 is rotated about its pivot 165 in a clockwise direction, supply valve 162 is unseated while release valve 163 is urged against its seat with a greater force. When the lever 164 is rotated in the opposite or counterclockwise direction, release valve 163 is unseated and supply valve 162 is held seated with an increased force.

For actuating the lever 164 there are provided two diaphragms 170 and 171. The diaphragm 170 is subject on its upper side to pressure of fluid in a chamber 172 and on its lower side to pressure of fluid in the chamber 161. The diaphragm 171 is subject on its upper side to pressure of fluid in a chamber 173, which chamber is maintained at atmospheric pressure by virtue of continuously open port 174 leading to the atmosphere, and is subject on its lower side to pressure of fluid in the chamber 161.

The two diaphragms 170 and 171 are mechanically connected to the lever 164 through links or stems 175, and the arrangement is such that for a given pressure of fluid supplied to chamber 172, the lever 164 will be actuated to hold supply valve 162 unseated until the pressure of fluid supplied to chamber 161 bears a definite ratio to the pressure of fluid supplied to chamber 172, whereupon diaphragms 170 and 171 move upwardly far enough to seat valve 162. For example, the two stems 175 may be spaced from the fulcrum point 165 so that the pressure established in the chamber 161 will always be equal to one third of the pressure of fluid supplied to the chamber 172.

If the pressure in chamber 161 should exceed this chosen ratio, then diaphragms 170 and 171 would both be actuated upwardly far enough to unseat the release valve 163, and thus release fluid under pressure to the atmosphere through exhaust passage 176 until the pressure had dropped to that corresponding to the selected ratio. It will thus be seen that the reducing relay valve device functions to establish in chamber 161 pressures bearing a fixed ratio to pressures established in chamber 172.

The die-away magnet valve device 31 is preferably embodied in a casing provided with a supply valve 178 and an abutting release valve 179, urged toward seated and unseated positions, respectively, by a spring 180. An electromagnet in the upper part of the valve device casing functions when energized to unseat the supply valve 178 and seat the release valve 179.

When the release valve 179 is seated, and the supply valve 178 unseated, a communication is established between a low pressure pipe 181 and a second pipe 182, but when the supply valve 178 is seated and the release valve 179 is unseated this communication is cut off and the pipe 182 is connected to the atmosphere past the unseated release valve 179 and through exhaust port 183.

Each of the rectifier devices 34 comprises a bank of rectifier units 185 connected as shown in Fig. 1, so that when input terminals 186 are connected to the checking winding 33, output terminals 187 of one rectifier device are connected to the output terminals 187 of the other rectifier device through a resistance device 188.

The individual rectifier units 185 are connected to produce what is known as "full way rectification", and the two rectifier devices 34 are inter-connected so that the output voltage of one rectifier device adds to the output voltage of the other rectifier device, the voltage drop across the resistance device 188 then being proportional to the combined output voltages of the two rectifier devices.

The checking winding 33 of each eddy current brake device may be incorporated in the eddy current brake device in the manner shown in my aforesaid patent, and is preferably arranged so that the voltage produced therein is proportional to the braking effect produced by the eddy current brake device. It is to be here understood that each two eddy current brake devices will have associated therewith two rectifier devices 34 connected to the associated checking windings 33 as indicated in Fig. 1.

The wheel slip detector relay 35 is preferably connected between the two common output terminals 187 of the two rectifier devices 34 and the mid-point of the resistance device 188, so that with the output voltages of the two rectifier devices equal the wheel slip detector relay will be deenergized. When, however, the output voltage of one rectifier device drops substantially below the output voltage of the other rectifier device, as when the wheels braked by one eddy current brake begin to slip, the wheel slip detector relay will be energized. This relay is preferably of the slow release type, so that when the slipping wheels again rotate at normal speed a predetermined interval of time elapses upon deenergization of the relay before it will open its contacts.

The motion detector device 39 preferably includes a casing formed from electrically insulating materials having disposed therein in spaced relationship two electrically conducting plates 190, between which are disposed granules of some conducting material 191, as for example carbon granules. The motion detector device is preferably secured to some part of the head end car which is subject to appreciable vibration while the car is in motion.

The feature of importance in connection with the motion detector device 39 is that while the vehicle is in motion above a certain predetermined speed, as for example seven or eight miles per hour, the motion detector device will be vibrated sufficiently so that the conducting path between the two plates 190, through the granules 191, will be of such resistance that the motion detector relay 38 connected in circuit therewith will be insufficiently energized to actuate its contacts. When, however, the speed of the vehicle drops below seven or eight miles per hour, the granules 191 will settle and diminish the resistance to a value such that the motion detector relay 38 will be energized sufficiently to close its contacts. From experience it has been determined that during appreciable vibration the resistance between the plates 190 may arise to as much as ten times the resistance when at rest.

The push switch 40 comprises essentially a bridging contact 192 normally biased by a spring 193 to a position where it bridges stationary contacts 194. When a push button 195 is depressed, contact 192 is disengaged from contacts 194.

While the push switch 40 has been shown as being of the manually operated type, it is to be understood that this type is merely illustrative of one of a large number of types which may be employed to perform a similar function.

The operation of this embodiment of my invention is as follows:

*Running condition*

When the train is running under power or coasting, handle 71 of the brake valve device 15 is maintained in release position, and, as will appear more fully hereinafter, both the eddy current brakes and fluid pressure brakes will be held released.

During running condition the main reservoir 17 on the head end car, and the main reservoir pipe 72 which extends throughout the train, are maintained charged from the usual compressor equipment (not shown) to some predetermined value, as for example from ninety to one hundred and five pounds per square inch. Each local supply reservoir 18 on each car in the train will then be charged from the main reservoir pipe 72 through a non-return check valve device 196, which permits flow from the main reservoir pipe to the local supply reservoir but prevents flow in the reverse direction, so that if the main reservoir pipe is ruptured sufficient fluid under pressure will be retained in the local supply reservoir to insure an application of the brakes on each car.

The suppression magnet valve device 26 on each car will be deenergized during running condition, so that fluid under pressure at local supply reservoir pressure will be supplied to piston chamber 141 of the transfer valve device 28. The piston 143 and slide valve 142 of each of these devices will be thus positioned as shown in Fig. 7.

Motion detector relay 38 will be deenergized during running condition so long as the speed of the vehicle is above some low chosen value, as for example the seven or eight miles per hour heretofore assumed.

Before the train is started up, the motion detector relay 38 will be energized from a battery 197 on the head end car through a circuit which includes conductor 198, battery train wire 199, conductors 200 and 201, relay 38, conductor 202, and motion detector device 39, the return circuit to the battery 197 being by way of ground connection 203. Relay 38 will then open its upper contacts 204 and close its lower contacts 205.

Closing of the lower contacts 205 energizes the magnet valve device 112 in each eddy current brake control device 22, through a circuit which beginning at the battery train wire 199 includes conductor 200, push switch device 40, conductor 206, contacts 205 of relay 38, train conductor 207, and branch conductor 208, the return circuit to the battery being through ground connection 209. The magnet valve device 112 being thus energized will seat its release valve 114 and unseat its supply valve 113, to effect a supply of fluid under pressure to both piston chambers 109 and 125. As before explained, a tension will then be placed on spring 94 according to the load on the car with which the eddy current brake control device 22 is associated. Each eddy current brake control device 22 will therefore be pre-conditioned to produce an eddy current braking effect on each car corresponding to the load on that individual car.

While the vehicle is running and the motion detector relay 38 is deenergized, or insufficiently energized to maintain its contacts 205 closed, the magnet valve device 112 in each eddy current brake control device 22 will be deenergized. The load control portion of each eddy current brake control device 22 is therefore operative only while the train is at rest or below the speed which operates the motion detector relay 38.

The other parts of the brake equipment not specifically referred to will be in the positions shown in the drawings, during running condition.

*Service application*

When it is desired to effect a service application of the brakes, the brake valve handle 71 is moved into the application zone to a degree according to the desired degree of braking. Release valve 45 is then seated and supply valve 43 unseated, to effect a supply of fluid under pressure from the main reservoir 17 to the pressure chamber 42 to a degree corresponding to the extent of movement of handle 71, as heretofore explained.

At the same time, seating of release valve 45 opens release contacts 67, while unseating of supply valve 43 closes application contacts 65. Opening of release contacts 67 effects deenergization of the release electromagnet in the magnet valve device 20 on each car in the train, by interrupting a circuit from battery train wire 199, which includes conductor 211, release contacts 67, release train conductor 212, branch conductor 213, the release electromagnet, and ground connection 214. Release valve 75 is then seated by spring 77 to close the local exhaust communication between the straight air pipe 16 and the atmosphere.

Closing of application contacts 65 effects energization of the application electromagnet in each magnet valve device 20, by establishing a circuit from the battery train wire 199 which includes conductors 200 and 215, application contacts 65, application train conductor 216, branch conductor 217, the application electromagnet, and ground connection 214. The supply valve 74 in each magnet valve device 20 is then unseated, to supply fluid under pressure locally from each supply reservoir 18 to the straight air pipe 16, through the pipes and passages heretofore described. Straight air pipe pressure will then be quickly established throughout the train.

When the pressure in the pressure chamber 42 of the brake valve device 15 reaches that corresponding to the position of handle 71, movable abutment 46 will effect seating of supply valve 43 and opening of application contacts 65, while maintaining release valve 45 seated and release contacts 67 opened. Straight air pipe pressure throughout the train will then correspond to the position of handle 71.

Fluid under pressure in the straight air pipe 16 flows to piston chamber 93 in each eddy current brake control device 22, by way of branch pipes 78 and 79. With spring 94 in each control device 22 conditioned according to the load on that car, drum 85 will be rotated until a balance is obtained between the pressure exerted by spring 94 and the pressure of fluid in chamber 93. Sections of resistance 88 will therefore be shunted, so that the current supplied to the eddy current brake windings 10 will cause the eddy current brake devices to produce a braking effect proportional to both straight air pipe pressure and the car load.

Current to energize the eddy current brake windings may be supplied from a power plant on the train, from a third rail, or through a trolley 218. In the embodiment shown, the circuit from the trolley 218 is controlled by the aforementioned line switch or contactor 23. Energization of this line contactor is controlled by the motion detector relay 38 and pneumatic switch device 24. At a low pressure of fluid in the straight air pipe 16, as for example five pounds per square inch, pneumatic switch device 24 actuates its movable contact 130 into engagement with stationary contacts 131, and since during running condition contacts 204 of motion detector relay 38 will be closed, line contactor 23 will be energized through a circuit which beginning at battery train wire 199 includes, conductor 200, push switch device 40, conductor 206, contacts 130 and 131 of pneumatic switch device 24, contacts 204 of motion detector relay 38, train wire 220, line contactor 23, and ground connection 221.

Line contactor 23 will then close its contacts to complete the circuit to the eddy current brake windings 10, which circuit includes trolley 218, contacts of line contactor 23, all or a portion of resistance 88, conductor 222, contact 223 of selector relay 36, conductor 224, resistance device 225, conductor 226, eddy current brake windings 10 and ground connection 227. The eddy current brake devices will thus be applied to a degree corresponding to the position of handle 71 and to the load on the individual car.

Fluid under pressure in the straight air pipe 16 also flows by way of branch pipe 78 to chamber 172 in each reducing relay valve device 32. Diaphragm 170 is then actuated downwardly to effect unseating of supply valve 162, to supply fluid under pressure from the local supply reservoir 18 to chamber 161, by way of pipe and passage 228. As soon as the pressure of fluid in chamber 161 has reached a value bearing a definite ratio to the pressure of fluid in the straight air pipe, diaphragms 170 and 171 will be actuated upwardly far enough to effect seating of supply valve 162. For the purpose of illustration, it will be assumed that the pressure established in chamber 161 will be one third of the pressure in chamber 172 and the straight air pipe 16.

From chamber 161 fluid flows through low pressure pipe 181 to the die-away magnet valve device 31 and through pipe 236 to the transfer valve device 28.

Now since the eddy current brakes are immediately effective at the high speeds, the train will be decelerated at a rate corresponding to the degree of application of the eddy current brakes. The resulting inertia effect on the pendulum 150 of the retardation detector device 30 will cause the pendulum to swing to the left. Before the pendulum swings to the left contacts 152 will be closed and thus cause die-away magnet valve device 31 to be energized through a circuit which includes from battery train wire 199, conductor 200, push switch device 40, conductor 206, contacts 130 and 131 of pneumatic switch device 24, conductor 250, contacts 152, train conductor 251, branch conductor 252, magnet valve device 31, and ground connection 235. As the pendulum swings to the left this circuit is interrupted and the die-away magnet valve device 31 is deenergized. When this magnet valve device is deenergized, supply valve 178 is seated and communication between low pressure pipe 181 and pipe 182 is cut off.

Movement of pendulum 150 to the left is opposed by fluid pressure acting on piston 158, due to the flow of fluid from the straight air pipe 16 to the piston chamber 159. However, for any given degree of application of the eddy current brakes, the pendulum 150 will be swung far enough to the left to open contacts 152. The die-away magnet valve device 31 will thus be caused to prevent an application of the fluid pressure brakes due to the supply of fluid under pressure to the low pressure pipe 181.

Fluid under pressure flowing from the low pressure pipe 181 through pipe 236 to the transfer valve device 28 flows to slide valve chamber 140. Up to this time piston 143 has been subject to fluid pressure from piston chamber 141 only, and has thus been actuated to its right hand position, as shown in Fig. 7.

Now if the piston 143 and slide valve 142 of the transfer valve device 28 were to remain in the positions shown in Fig. 7, then fluid under pressure in the straight air pipe 16 would also flow to the brake cylinders 12 through branch pipes 78, 79 and 230, cavity 231 in slide valve 142, and brake cylinder pipe 232. However, when current is supplied to the eddy current brake windings 10 through the resistance device 225, the power responsive relay 25, which is shunted across resistance device 225, will be energized at a low value of power current and thus close its contacts.

With these contacts closed, the suppression magnet valve device 26 is energized from the train battery wire 199, through a circuit which includes conductor 198, contacts of relay 25, conductor 234, magnet valve device 26, and ground connection 235. The suppression magnet valve device 26 then actuates its double beat valve 132 to lower seated position, to disconnect transfer valve piston chamber 141 from the local supply reservoir 18, and to vent this chamber to the atmosphere, through exhaust port 138 in the suppression magnet valve device.

Fluid under pressure will then flow from piston chamber 141 through chamber 134 of double check valve device 135, and pipe 137 to the atmosphere. The opposite chamber 240 of the double check valve device 135 is connected to the straight air pipe 16 by way of branch pipe 78, so that as soon as the pressure in chamber 134 has dropped slightly below the pressure in the straight air pipe, slide valve 241 in the double check valve device will be shifted to the left, and the pressure of fluid in the transfer valve piston chamber 141 will remain at straight air pipe value.

Now spring 145 in the transfer valve device is designed to actuate piston 143 to its left hand position whenever the differential fluid pressure acting to the left of the piston diminishes below a predetermined value, as for example fifty pounds per square inch. That is, whenever the fluid pressure in piston chamber 141 does not exceed the fluid pressure in slide valve chamber 140 by more than fifty pounds per square inch, spring 145 actuates the piston and slide valve to the left.

For the conditions assumed in the present case, the maximum straight air pipe pressure which may be effected during a service application will not exceed sixty-five pounds per square inch. Therefore, since the pressure in the low pressure pipe 181 will be one third of the straight air pipe pressure, it will be obvious that the fluid pressure differential acting to the left of the piston will be considerably below fifty pounds per square inch during a service application. Spring 145 will therefore shift piston 143 and slide valve 142 to their extreme left hand positions, so that fluid does not flow from the straight air pipe 16 to the brake cylinders 12.

It will thus be seen that during a service application of the brakes the eddy current brakes only are applied while the fluid pressure brakes are conditioned as a "stand-by brake".

Since the braking effect produced by the eddy current brake devices will produce a substantially constant rate of retardation, the train will be decelerated smoothly. If, however, the train should run onto a slippery rail, and it be assumed that the wheels brake by one of the eddy current brake devices should begin to slip, then the voltage produced by the checking winding 33 associated with that brake device would diminish, and as a consequence wheel slip detector relay 35 would be energized. When this relay is energized it closes both its upper contacts 243 and its lower contacts 244. Closing of the upper contacts 243 provides a by-pass circuit around the contacts of the power response relay 25, so as to insure energization of the suppression magnet valve device 26 when the current supplied to the eddy current brake windings is subsequently cut off.

Closing of lower contacts 244 energizes the selector relay 36, through a circuit which beginning at train battery wire 199 includes conductor 193, contacts 244, selector relay 36 and ground connection 245. The selector relay 36 then opens its lower contact 223 and closes its upper contact 246. Opening of lower contact 223 cuts off the supply of current to the eddy brake windings 10, while closing of upper contact 246 connects a resistance device 247 in circuit with the resistance 88 of the eddy current brake control device 22.

The resistance device 247 has a resistance value substantially equal to two eddy current brake windings 10, so that if there are a number of such pairs of eddy current brake windings on the car, then the disconnection of any two such sets will not materially raise the voltage on the remaining sets and thereby cause them to produce an increased braking effect, such as would possibly cause additional wheels to slide.

With the brakes associated with the slipping wheels thus wholly released, the slipping wheels will again pick up speed and will in all probability again roll at normal speed. The unbalanced low voltage condition resulting during slipping wheel condition will therefore gradually change to a balanced voltage condition, and wheel slip detector relay 35 will after a predetermined interval of time open its contacts 243 and 244. Selector relay 36 will then be deenergized to again close the circuit to the eddy current brake windings 10, and power response relay 25 will also be energized to maintain suppression magnet valve device 26 energized.

This cycle will repeat itself until the rail conditions improve to the point where wheel slipping does not occur.

If the current supply to the eddy current brake windings 10 should fail, then power response relay 25 would be deenergized and suppression magnet valve device 26 would as a consequence also be deenergized. Fluid under pressure would then flow from the local supply reservoir 18 to transfer valve piston chamber 141, and since the pressure of this supply is from 90 to 105 pounds per square inch, a pressure differential on piston 143 would be produced great enough to shift slide valve 142 to the extreme right hand position.

Cavity 231 will then connect pipes 230 and 232, so that fluid under pressure would flow from the straight air pipe 16 to the brake cylinders 12, and thus produce a brake application to a degree corresponding directly to straight air pipe pressure.

Now when the train speed diminishes to approximately ten miles per hour due to eddy current braking, the braking effect produced by the eddy current brake devices will diminish, first slowly and then rapidly, and as a consequence the rate of retardation will reduce. When the rate of retardation has reduced to approximately one half of that produced at the upper speeds by an application of the eddy current brakes, the pendulum 150 will have receded toward its neutral position far enough for contacts 152 to close. Closing of these contacts again completes the circuit to the die-away magnet valve device 31, and this magnet valve device seats its release valve 179 and unseats its supply valve 178.

Fluid under pressure then flows from the low pressure pipe 181, past the unseated supply valve 178, through pipe 182, cavity 231 of slide valve 142 in transfer valve device 28, and brake cylinder pipe 232 to the brake cylinders 12. The fluid pressure brakes will thus be applied as the eddy current brakes are diminishing in effectiveness.

Now since the pressure of fluid in the low pressure pipe 181 is only one third of that in the straight air pipe 16, the fluid pressure brakes will be applied to a much lower degree than were the eddy current brakes initially, so that the train will be brought to a smooth stop free of shock.

At a speed of about seven or eight miles per hour, the motion detector relay 38 will be sufficiently energized to open its contacts 204 and to close its contacts 205. Opening of contacts 204 causes deenergization of line contactor 23, thereby deenergizing the eddy current brake windings 10 and thus effecting a release of the eddy current brakes. Closing of contacts 205 renders effective the load control portion of the eddy current brake control valve device 22, as previously described.

Therefore, as the train comes to a stop the eddy current brake devices will be cut out of action and the fluid pressure brakes will be applied. To effect a release of the brakes, the brake valve handle 71 is turned to release position, whereupon the straight air pipe 16 is vented to the atmosphere at the head end of the train through the brake valve device 15, and locally on each car past the unseated release valve 75 in each magnet valve device 20. The parts then assume the release positions shown in the drawings.

*Emergency application*

When it is desired to effect an emergency application of the brakes, the brake valve handle 71 is turned to the extreme application position, where supply valve 43 of the brake valve device is held unseated sufficiently to permit main reservoir pressure to be established in the pressure chamber 42, and where application contacts 65 are maintained closed. The straight air pipe therefore will be supplied with fluid at main reservoir pressure, with the result that the eddy current brakes will be applied to a maximum degree. In all other respects an emergency application of the brakes is the same as a service application, the difference being one of degree rather than in function.

To effect a release of the brakes following an emergency application, the brake valve handle 71 is turned to release position, and the brakes thus released as for a release following a service application.

Now if at any time it is desired to render the eddy current brakes inoperative, pressure is manually applied to the push button 195 of the push switch device 40. This effects disengagement of contacts 192 from contacts 194, and prevents energization of line contactor 23. Application of the brakes may then be effected only by operation of the fluid pressure brakes, which, as will be obvious from the preceding description, will be to a degree corresponding directly to straight air pipe pressure as the suppression magnet valve device 26 will be deenergized, the piston 143 of transfer valve device 28 thus positioned to the right, and straight air pipe 16 therefore connected to brake cylinder pipe 232 by cavity 231 in slide valve 142.

While I have illustrated my invention in connection with a single embodiment thereof, it will be apparent to those skilled in the art that many modifications and changes therein may be made and I do not wish to be limited in this respect other than by the spirit and scope of the appended claims.

Having now described my invention, what I claim as new and desire to secure by Letters Patent, is:

1. In a train brake system, in combination, fluid pressure brake means and electric brake means associated with each car in the train, a pipe adapted to extend throughout the train, control means on the head end car having a manually operated element for controlling the supply of fluid under pressure to and its release from said pipe on the head end car according to the degree of movement of said element, electro-responsive valve means on one or more cars throughout the train for controlling the supply of fluid under pressure to and its release from said pipe in synchronism with said control means and also according to the degree of movement of said element, and means for controlling applications of said fluid pressure brake means and said electric brake means according to the pressure of fluid in said pipe.

2. In a vehicle brake system, in combination, fluid pressure brake means, electric brake means, means for effecting an application of said electric brake means, and means operable when the degree of effectiveness of said electric brake means diminishes below a predetermined value for effecting an application of said fluid pressure brake means to a degree having a fixed ratio to the initial degree of application of said electric brake means.

3. In a vehicle brake system, in combination, fluid pressure brake means, electric brake means operable to produce a braking effect which diminishes at low rotational speeds, a pipe, means for establishing fluid pressures in said pipe, means for effecting an application of said electric brake means according to the degree of pressure in said pipe, and means operable when the degree of braking effect produced by said electric brake means diminishes below a predetermined value for effecting an application of said fluid pressure brake means to a degree corresponding to a fraction of the pressure established in said pipe.

4. In a vehicle brake system, in combination fluid pressure brake means, electric brake means, a pipe, means for establishing fluid pressures in said pipe according to a desired degree of application of the brakes, means for effecting an application of said electric brake means according to pressures established in said pipe, means operable when the effectiveness of the electric brake means diminishes below a predetermined degree for effecting an application of said fluid pressure brake means, and means for limiting the effectiveness of the fluid pressure brake means to a degree corresponding to a pressure less than that established in said pipe.

5. In a vehicle brake system, in combination, fluid pressure brake means, electric brake means, a pipe, means for establishing fluid pressures in said pipe according to desired degrees of braking, means for effecting an application of said electric brake means according to pressures established in said pipe, valve means for effecting an application of said fluid pressure brake means to a degree less than the degree of application of said electric brake means, and means for preventing the application of said fluid pressure brake means while the effectiveness of said electric brake means is above a chosen value.

6. In a vehicle brake system, in combination, fluid pressure brake means, electric brake means, a pipe, means for establishing fluid pressures in said pipe according to a desired degree of braking, means for effecting an application of said electric brake means according to pressures established in said pipe, means also operable to effect an application of said fluid pressure brake means also according to pressures established in said pipe but to a degree less than and bearing a fixed ratio to the degree of application of said electric brake means, and means preventing said application of fluid pressure brake means until the degree of effectiveness of the electric brake means diminishes to a predetermined value.

7. In a vehicle brake system, in combination, fluid pressure brake means, electric brake means, a pipe, means for establishing a fluid pressure in said pipe according to a desired degree of braking, means for effecting an application of said electric brake means according to the degree of pressure established in said pipe, means responsive to the pressure in said pipe and having a chamber in which a fluid pressure is established to a degree less than that established in said pipe, and means operable when the effectiveness of said electric brake means diminishes below a predetermined value for effecting an application of said fluid pressure brake means according to the pressure established in said chamber.

8. In a vehicle brake system, in combination, a brake cylinder, an electric brake device operable to produce a braking effect which diminishes at low rotational speeds, a pipe, means for establishing fluid pressures in said pipe, means for effecting an application of said electric brake device according to pressures established in said pipe, a valve device having a chamber and operable to establish pressures in said chamber less than and bearing a fixed ratio to the pressures in said pipe, and means operable when the braking effect produced by said electric brake device diminishes below a predetermined value for effecting a supply of fluid under pressure to said brake cylinder to a degree corresponding to the degree of pressure in said chamber.

9. In a vehicle brake system, in combination, fluid pressure brake means, electric brake means, a pipe adapted to have fluid under pressure supplied thereto, a reducing relay valve device operably responsive to pressure of fluid in said pipe to supply fluid under pressure to a reduced degree to effect an application of said fluid pressure brake means, and means operable when effecting an application of said electric brake means for preventing said application of said fluid pressure brake means until the degree of effectiveness of said electric brake means has diminished below a predetermined degree.

10. In a vehicle brake system, in combination, fluid pressure brake means, electric brake means, a pipe adapted to have fluid under pressure supplied thereto, means for effecting an application of said electric brake means according to the degree of fluid under pressure supplied to said pipe, a valve device responsive to the pressure of fluid in said pipe for effecting a supply of fluid under pressure to said fluid pressure brake means to a degree less than and bearing a fixed ratio to the pressure of fluid in said pipe, electroresponsive valve means for controlling said reduced supply, and means controlled by the electric brake means for controlling said electroresponsive valve means.

11. In a vehicle brake system, in combination, fluid pressure brake means, electric brake means, a pipe, means for supplying fluid under pressure to said pipe to a degree according to a desired degree of braking, means for effecting an application of said electric brake means in response and according to the degree of fluid under pressure supplied to said pipe, means also responsive to fluid under pressure supplied to said pipe for effecting an application of said fluid pressure brake means, and means governed by the rate of retardation of the vehicle for preventing said application of said fluid pressure brake means until the degree of effectiveness of the electric brake means has diminished to a predetermined value.

12. In a vehicle brake system, in combination, fluid pressure brake means, electric brake means, means for effecting an application of said electric brake means, means operated according to the rate of retardation of the vehicle, means responsive to operation of said last means above a selected rate of retardation for preventing an application of said fluid pressure brake means and operable below said selected rate of retardation for effecting an application of said fluid pressure brake means, and means for establishing said selected rate of retardation according to the degree of application of said electric brake means.

13. In a vehicle brake system, in combination, a fluid pressure brake means, an electric brake means, a pipe, means for supplying fluid under pressure to said pipe, means for effecting an application of said electric brake means according to the pressure of fluid supplied to said pipe, means governed by the rate of retardation of the vehicle for delaying effective application of said fluid pressure brake means, and means for controlling said last means according to the pressure of fluid supplied to said pipe.

14. In a vehicle brake system, in combination, fluid pressure brake means, electric brake means, a pipe, means for supplying fluid under pressure to said pipe, means for effecting an application of said electric brake means according to the pressure of fluid supplied to said pipe, means operated according to the rate of retardation of the vehicle, means responsive to a chosen operation of said last means for preventing an application of said fluid pressure brake means, and responsive to a different operation of said last means for effecting an application of said fluid pressure brake means, and means responsive to the pressure of fluid supplied to said pipe for controlling said retardation controlled means.

15. In a vehicle brake system, in combination, a fluid pressure brake means, an electric brake means, means for effecting an application of said electric brake means, a set of contacts, means including a pendulum device responsive to the rate of retardation of the vehicle for operating said contacts, means responsive to one operation of said contacts for preventing an application of said fluid pressure brake means and responsive to another operation of said contacts for effecting an application of said fluid pressure brake means.

16. In a vehicle brake system, in combination, a fluid pressure brake means, an electric brake means, means for effecting an application of said electric brake means, normally closed contacts, means operable when said contacts are closed for effecting an application of said fluid pressure brake means, and means including a pendulum device governed by the rate of retardation of the vehicle for maintaining said contacts open above a predetermined rate of retardation and for closing said contacts below said rate.

17. In a vehicle brake system, in combination, fluid pressure brake means, electric brake means, a pipe, means for supplying fluid under pressure to said pipe, means for effecting an application of said electric brake means according to the pressure of fluid supplied to said pipe, a set of contacts, means responsive to operation of said contacts for effecting an application of said fluid pressure brake means, inertia operated means operated according to the rate of retardation of the vehicle for operating said contacts to prevent application of said fluid pressure brake means, and means operated according to the pressure of fluid in said pipe for controlling operation of said inertia operated means.

18. In a vehicle brake system, in combination, a fluid pressure brake means, an electric brake means, a pipe, means for supplying fluid under pressure to said pipe, means for effecting an application of said electric brake means according to the pressure of fluid supplied to said pipe, means operable to effect an application of said fluid pressure brake means either to a degree according to the degree of pressure in said pipe or to a degree less than according to the pressure in said pipe, means operable upon total failure of said electric brake means to cause said last means to effect an application of said fluid pressure brake means according to the degree of pressure in said pipe but operable upon a predetermined decrease in effectiveness only of said electric brake means for causing said last means to effect an application of said fluid pressure brake means to said lesser degree.

19. In a vehicle brake system, in combination, fluid pressure brake means, electric brake means, a pipe, means for effecting an application of said electric brake means according to the degree of fluid under pressure supplied to said pipe, means operable while the electric brake means is effective in producing a desired braking effect for preventing application of said fluid pressure brake means, means operable when the electric braking effect diminishes below a predetermined value for effecting an application of said fluid pressure brake means to a degree less than and bearing a fixed ratio to the degree of pressure in said pipe, and means for delaying application of said fluid pressure brake means for a definite interval of time.

20. In a vehicle brake system, in combination, electric brake means, a pipe, means for supplying fluid under pressure to said pipe, means for effecting an application of said electric brake means according to the pressure of fluid supplied to said pipe, and means operable so long as the pressure in said pipe is above a predetermined value for cutting said electric brake means out of action when the speed of the vehicle diminishes below a chosen value.

21. In a vehicle brake system, in combination, fluid pressure brake means, electric brake means, a pipe, means for supplying fluid under pressure to said pipe, means for effecting an application of said electric brake means according to the pressure of fluid supplied to said pipe, means operative while said electric brake means is effective for preventing an application of said fluid pressure means and operative when said electric brake means is cut out of action for effecting an application of said fluid pressure brake means according to the pressure of fluid supplied to said pipe, and manually controlled means for cutting said electric brake means out of action at will.

22. In a vehicle brake system, in combination, fluid pressure brake means, electric brake means, means for effecting an application of said electric brake means, a valve device operable in a first position to effect an application of said fluid pressure brake means to one degree and operable in a second position to effect an application to a different degree, and means for maintaining said valve device in said first position so long as said electric brake means is effective and for shifting said valve device to said second position upon failure of said electric brake means.

23. In a vehicle brake system, in combination, a brake cylinder, a first pipe adapted to have fluid under pressure supplied thereto to one degree, a second pipe adapted to have fluid under pressure supplied thereto to a lower degree, a valve device operable in one position to supply fluid under pressure from said first pipe to said brake cylinder and being shiftable to a second position to supply fluid under pressure from said second pipe to said brake cylinder, electric brake means, means operable upon effecting an application of said electric brake means for shifting said valve device to said second position and operable upon failure of said electric brake means for shifting said valve device to said first position.

24. In a vehicle brake system, in combination, electric brake means, a circuit for supplying current to operate said electric brake means, means for connecting said circuit to a source of current supply, the E. M. F. of said source diminishing when so connected due to the current load, means for disconnecting said circuit from said source during the time wheels braked by said brake means are slipping, and means for preventing the E. M. F. of said source from increasing due to decrease in current load while said wheels are slipping.

25. In a vehicle brake system, in combination, fluid pressure brake means, electric brake means, a control pipe through which fluid under pressure is supplied to effect an application of the brakes, means for controlling the operation of said electric brake means to produce a braking effect thereby corresponding directly to the pressure of fluid in said control pipe, an application pipe through which fluid under pressure is supplied to effect the operation of said fluid pressure brake means to produce a braking effect thereby corresponding to the pressure in said application pipe, and valve means interconnecting said control pipe and said application pipe and operable in response to pressures in said control pipe to establish fluid pressures in said application pipe to a degree bearing a fixed ratio to the degree of pressure in said control pipe.

26. In a vehicle brake system, in combination, fluid pressure brake means, electric brake means, a pipe through which fluid under pressure is supplied to effect an application of the brakes, means responsive to pressure in said pipe for effecting the operation of said electric brake means to produce a braking effect corresponding directly to the degree of pressure in said pipe, and means responsive also to pressure in said pipe for effecting a supply of fluid under pressure to a degree less than and bearing a fixed ratio to the pressure in said pipe, to effect the operation of said fluid pressure brake means.

27. In a vehicle brake system, in combination, fluid pressure brake means, electric brake means, a pipe, means for establishing fluid pressures in said pipe, means for controlling the operation of said electric brake means to cause a braking effect to be produced thereby corresponding to the pressure established in said pipe, and valve means connected to and interposed between said pipe and said fluid pressure brake means for establishing fluid pressures to a degree less than but governed by the degree of pressure in said pipe, to control the operation of said fluid pressure brake means.

28. In a vehicle brake system, in combination, fluid pressure brake means, electric brake means, a control pipe through which fluid under pressure is supplied to effect an application of the brakes, means for controlling the operation of said electric brake means to produce a braking effect thereby corresponding directly to the pressure of fluid in said pipe, means including an application pipe through which fluid under pressure is supplied to effect the operation of said fluid pressure brake means to produce a braking effect thereby corresponding to the pressure in said application pipe, valve means interconnecting said control pipe and said application pipe and operable in response to pressures in said control pipe to establish fluid pressures in said application pipe to a degree bearing a fixed ratio to the degree of pressure in said control pipe, a positionable element, and means for also controlling the operation of said fluid pressure brake means according to the position of said element.

29. In a vehicle brake system, in combination, fluid pressure brake means, electric brake means, a pipe through which fluid under pressure is supplied to effect an application of the brakes, means responsive to pressures in said pipe for effecting the operation of said electric brake means to produce a braking effect corresponding directly to the degree of pressure in said pipe, means responsive also to pressure in said pipe for effecting a supply of fluid under pressure to a degree less than and bearing a fixed ratio to the pressure in said pipe, to effect the operation of said fluid pressure brake means, a positionable element, and means for also controlling the operation of said fluid pressure brake means according to the position of said element.

30. In a vehicle brake system, in combination, fluid pressure brake means, electric brake means, a pipe, means for establishing fluid pressures in said pipe, means for controlling the operation of said electric brake means to cause a braking effect to be produced thereby corresponding to the pressures established in said pipe, valve means connected to said pipe and interposed between said pipe and said fluid pressure brake means for establishing fluid pressures to a degree less than but governed by the degree of pressure in said pipe, to control the operation of said fluid pressure brake means, a positionable element, and means for also controlling the operation of said fluid pressure brake means according to the position of said element.

JOHN W. LOGAN, Jr.